United States Patent [19]

Blin et al.

[11] 4,001,462

[45] Jan. 4, 1977

[54] PROCESS FOR COATING SURFACES HAVING A BASE OF EPOXY RESINS MODIFIED BY UNSATURATED ACIDS AND COATINGS OBTAINED BY MEANS OF SAID PROCESS

[75] Inventors: Marie Francoise Blin, Antony; Gilbert Gaussens, Saint-Mande; Francis Lemaire, Clamart, all of France

[73] Assignee: Commissariat a l'Energie Atomique, Paris, France

[22] Filed: May 11, 1971

[21] Appl. No.: 142,277

[30] Foreign Application Priority Data

May 13, 1970 France .............................. 70.17473

[52] U.S. Cl. ........................... 427/44; 204/159.14; 204/159.22; 260/486 B; 260/837 R
[51] Int. Cl.$^2$ ........................................... B05D 3/06
[58] Field of Search ... 117/93.31, 161 UB, 161 ZB; 260/89.5 R, 91.1 R, 486 R, 486 B, 837 R; 204/159.14, 159.16, 159.22

[56] References Cited

UNITED STATES PATENTS

| | | | |
|---|---|---|---|
| 3,437,514 | 4/1969 | Burlant | 117/93.31 |
| 3,535,403 | 10/1970 | Holub et al. | 260/837 R |
| 3,586,526 | 6/1971 | Aronoff et al. | 117/93.31 |
| 3,631,127 | 12/1971 | Nomura et al. | 117/161 ZB |

OTHER PUBLICATIONS

Kirk–Othmer, *Encyclopedia of Chemical Technology*, 2nd Ed. vol. 8, pp. 304–307 and 811 (1965).
Zimmerman, et al., *Handbook of Material Trade Names*, 1st. Supp. p. 77 (1953).

*Primary Examiner*—John H. Newsome
*Attorney, Agent, or Firm*—Cameron, Kerkam, Sutton, Stowell & Stowell

[57] ABSTRACT

A coating compound which is hardenable under the action of ionizing radiations contains an epoxy resin which is modified by unsaturated carboxylic acids as a result of reaction of the COOH groups of the acids with the epoxy bridges of the resin and as a result of esterification of the hydroxyl groups of the resin.

2 Claims, 1 Drawing Figure

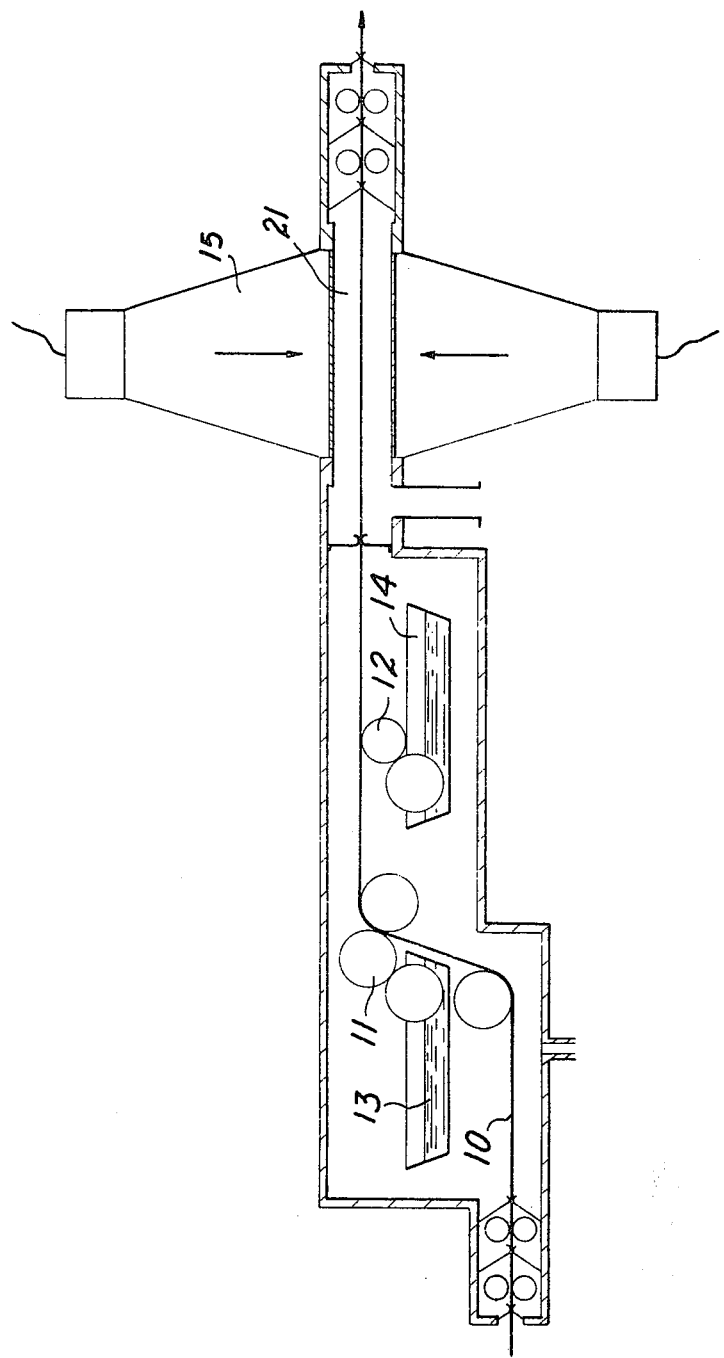

PROCESS FOR COATING SURFACES HAVING A BASE OF EPOXY RESINS MODIFIED BY UNSATURATED ACIDS AND COATINGS OBTAINED BY MEANS OF SAID PROCESS

This invention relates to a process for coating surfaces with varnishes, paints and coating compounds having a base of epoxy resins modified by unsaturated carboxylic acids which are hardenable under the action of radiation and further relates to the coatings obtained as a result of the application of said process. The surfaces which can be treated with the coatings according to the invention are of widely different types such as wood, concrete, plaster, plastic materials, paper, leather, metals and alloys and so forth.

Polymerization or cross-linking reactions are basic steps in processes which convert certain varnishes, paints and coating compounds into hard and insoluble products having enhanced chemical stability. As a rule, recourse is had to the use of additives such as organic peroxides and catalysts and/or to the application of heat in order to initiate or accelerate these reactions.

There are many problems which arise at the time of application of varnishes and paints. Among these may be mentioned in particular:
  removal or recovery of solvents (danger of fire or intoxication,
  storage of objects during drying (soiling of coatings during drying),
  formation of pores in the coating during evaporation of solvents,
  difficulties arising from limited physical and chemical stability of varnishes and paints.

The method of cross-linking by irradiation avoids the use of solvents and overcomes storage problems by reason of the practically instantaneous cross-linking which occurs at ordinary temperature. In addition to its fast action, the method involving the action of radiation for the hardening of coatings applies to articles of any type and prevents alteration of these latter in the case of wood, mortar and cement facing materials, concrete, plaster facing materials, plastic materials, paper and leather, the treatment being carried out at room temperature.

Drying of coatings under an electron beam permits the use of methods for coating surfaces with varnishes and paints which are much more highly mechanized and even rendered automatic in the case of large numbers of objects having the same shapes and dimensions. These methods are becoming increasingly attractive since they reduce labor cost, increase productivity and make it possible under certain conditions to carry out effective thickness control of dry coatings and to achieve an economy of varnish or paint. Such methods also permit processing in workshops equipped with devices for controlling environmental conditions (relative humidity, temperature, ventilation).

The varnishes can consist of macromolecular compounds, prepolymerized resins and/or the derivatives obtained as a result of modification of said varnishes by products having one or a number of olefinic unsaturations and/or radioactivatable groups.

The term "paint" is defined as a mixture consisting mainly of a colored or colorless binder and incorporating one or more pigmentary substances and/or mineral or organic fillers.

In the field of coatings having a base of epoxy resins, it is a known practice to make use of coatings having a base of epoxy resins which are modified by unsaturated acids in order to permit hardening under irradiation. In the methods of preparation of these resins, the —COOH groups of the acid react with the epoxy bridges

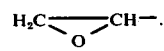

These resins are mixed with one or a number of vinyl monomers and are applied in thin layers to the substrates to be coated and the mixture is dried by irradiation. The present invention is essentially intended to achieve a further improvement in the properties of resins of this type and especially to facilitate hardening under irradiation.

The invention proposes a coating compound which is hardenable under the action of ionizing radiations and essentially contains an epoxy resin which is modified by unsaturated carboxylic acids as a result of reaction of the COOH groups of the acids with the epoxy bridges of the resin and as a result of esterification of the hydroxyl groups of said resin.

The invention also proposes a method of preparation of a coating compound which is hardenable under the action of ionizing radiations. Said method essentially comprises the preparation of an epoxy resin by reacting diphenylolpropane with epichlorohydrin and modification of said epoxy resin by unsaturated carboxylic acids both as a result of reaction of said acid with the epoxy bridges of the resin and as a result of esterification of the hydroxyl groups of the resin.

Esterification of the hydroxyl groups of the epoxy resin by the unsaturated alpha-beta carboxylic acids in accordance with the invention has the effect of increasing the unsaturation and therefore the reactivity of the resin.

Consideration being given by way of example to an epoxy resin which is obtained from diphenylolpropane and epichlorohydrin and with which methacrylic acid is reacted, the process can be presented schematically as follows:

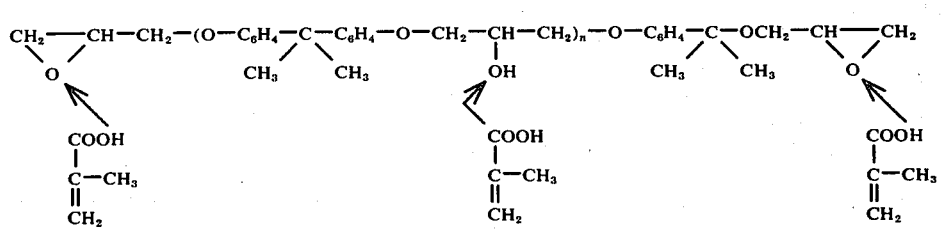

According to a preferred embodiment of the invention, modified resins with a high degree of unsaturation, the number of olefinic double bonds being of the order of 0.1 to 0.3 per 100 g resin, can be obtained from an epoxy unmodified resin prepared by reacting epichlorohydrin and diphenylolpropane and showing a viscosity of approximately 25 to 100 poises at 25° C, and up to the solid state, by reacting said unmodified resin at a pH comprised between 2.5and 4.5 with an excess of methacrylic acid. The amount of methacrylic acid is notably 150 to 250 % of that stoechiometrically corresponding to the number of epoxy and hydroxyl groups in the resin. The temperature is preferably around 110° to 120° C to avoid homopolymerization.

The modified epoxy resins may be deposited directly on the substrate to be coated without addition of vinyl monomers. These resins have a sufficient degree of fluidity to permit spreading on substrates without entailing any need to add either one or more monomers thereto. Since the addition of monomers to the base polymer is dispensed with, the coating can be dried by irradiation under a vacuum. The fact of irradiating under a vacuum makes it possible to employ low-energy electrons and to achieve higher efficiencies as a result of lower absorption of electrons by the substrate. Drying by irradiation under a vacuum is not possible when vinyl monomers are added to the modified epoxy resin since blisters are thus formed as a result of evaporation of the monomer and removal of this latter from the reaction mixture.

There is shown diagrammatically in the accompanying FIGURE an installation for continuous processing under a vacuum which illustrates the application of the method according to the invention. The substrate 10 to be coated is displaced through the installation by means of rollers. The substrate is coated with a layer of resin as it comes into contact with the rollers 11 and 12, said resin being contained in storage tanks 13 and 14. The substrate on which a resin layer has been deposited is then transferred into the irradiation chamber 21 and then irradiated within said chamber by means of an electron accelerator 15. A vacuum of the order of $10^{-2}$ mm of mercury is created within the enclosure in which the coating is formed and a vacuum of the order of $10^{-4}$ mm of mercury is created within the irradiation chamber.

The resin has a sufficient degree of viscosity to be applied to a substrate either by means of a roller, by sprinkling dipping spraying with a spray-gun either in the cold state or hot state without air or by means of the screening method.

The coating has a thickness which is usually within the range of 10 to 100 microns.

The energy of the electron beam or beams is within the range of 10 to 100 keV and is dependent on the thickness of the coating.

The radiation intensity usually ranges from 0.1 to 100 Mrad/sec., the coating being intended to receive a total dose between 0.1 and 100 Mrads and preferably between 1 and approximately 25 Mrads.

The term "rad" as employed in this context designates the radiation dose which results in the absorption of an energy of 100 ergs per gram of absorbent substance which constitutes the coating.

Cross-linkage of the resin or mixture of resins can be defined by its percentage of gel (degree of cross-linking) which depends on a certain number of parameters, in particular on the absorbed dose. Said degree of cross-linking is determined by subjecting the coating to an extraction, for example, in xylene or methyl ethylketone.

The advantages of the method according to the invention lie in the following features:
the addition of vinyl monomers to the modified epoxy resin is dispensed with,
the possibility of drying the coating by vacuum irradiation consequently permits the use of electrons having low energy.

Examples of application of the method according to the invention will now be described without any limitation being implied.

EXAMPLE 1

In a reaction vessel, 600 cm$^3$ of xylene, 172 g of methacrylic acid, 2 g of hydroquinone and 2 cm$^3$ of dimethylaniline are added to 380 g of epoxy resin prepared from diphenylolpropane and epichlorohydrin having an index of 0.48 to 0.58 a molecular weight of 380 and a viscosity of 10 Po at 25° C.

The mixture is heated to 120° C for a period of 3 hours with agitation and in a nitrogen atmosphere. After extraction of the xylene under a vacuum, the product obtained is deposited on a metallic substrate (phosphated steel sheet) and irradiated under a vacuum.

The film of varnish is deposited at 60° C under a vacuum without formation of blisters.

After irradiation, the coating obtained is perfectly dry and has a glossy and uniform appearance.

The results recorded in the following table show the influence of the radiation dose on the percentage of cross-linking (irradiation carried out under an electron beam and in a vacuum).

| Dose Mrad | 1 | 2 | 3 | 4 | 5 |
|---|---|---|---|---|---|
| % Of gel | 64 | 81 | 93 | 100 | 100 |

The percentage of gel has been determined by extraction in xylene at room temperature and/or in methylethyketone.

EXAMPLE 2

An epoxy resin prepared from diphenylpropane and epichlorhydrin and showing an hydroxy index of 0.40 (it is a solid resin with a melting point of 150° C) is reacted with methacrylic acid. In the reaction vessel containing 400 g of this resin, the following reactants are added: 500 cm$^3$ cyclohexanone, 500 cm$^3$ xylen, 260g methacrylic acid 4 cm$^3$ 2,4,6 tridimethylaminophenol, 4 g hydroquinone.

The mixture is maintained at 120° C in a nitrogen atmosphere with agitation for 8 hours. a modified resin with an index of unsaturation of 0.1 (number of olefinic double bonds per 100 g resin) is obtained. After extraction of the solvents under vacuum it is spread on a metallic substrate and irradiated by accelerated electrons to a dose of 5 Mrad.

What we claim is:
1. A method of coating with a coating compound which is hardenable under the action of ionizing radiations consisting essentially on an epoxy resin having hydroxyl groups modified by a stoechiometric excess of from 150 to 250% of unsaturated carboxylic acids as a result of reaction of the COOH groups of the acids with the epoxy bridges of the resin and as a result of esterification of the hydroxyl groups of said resin and has a number of olefinic double bonds on the order of 0.1 to o.3 per 100 g. of resin wherein said compound is applied directly to a substrate to be coated with a layer which has a thickness within the range of 10 to 100 microns and which is then dried by irradiation.

2. A method as defined in claim 1, wherein the irradiation is carried out with an electron beam having an energy within the range of 10,000 to 100,000 electronvolts.

* * * * *